United States Patent [19]
Choi

[11] Patent Number: 5,475,546
[45] Date of Patent: Dec. 12, 1995

[54] TAPE LOADING DEVICE

[75] Inventor: Myoung-soo Choi, Anyang, Rep. of Korea

[73] Assignee: Samsung Electronics Co., Ltd., Kyungki-Do, Rep. of Korea

[21] Appl. No.: 311,500

[22] Filed: Sep. 23, 1994

[30] Foreign Application Priority Data

Sep. 24, 1993 [KR] Rep. of Korea .................. 1993-19678

[51] Int. Cl.$^6$ ............................ G11B 5/027; G11B 5/008
[52] U.S. Cl. ................................. 360/85; 360/95
[58] Field of Search .................................... 360/85, 84, 95

[56] References Cited

U.S. PATENT DOCUMENTS 5,381,283  1/1995  Lee ............................................ 360/85

Primary Examiner—John H. Wolff
Attorney, Agent, or Firm—Sughrue, Mion, Zinn, Macpeak & Seas

[57] ABSTRACT

A tape loading device includes resilient biasing device on a pair of linkage arms for resiliently biasing a pair of pole bases in the loading direction while the tape is fully loaded. The biasing device includes a pair of torsion springs mounted on the linkage arms for providing a pushing force for the pole bases while the tape is loaded. The tape loading device can protect a driving gear member and a main slide from the pushing forces of the pole bases, and requires fewer components, to reduce manufacturing cost accordingly.

8 Claims, 6 Drawing Sheets

TAPE LOADING DEVICE

BACKGROUND OF THE INVENTION

1. Field of the Invention

The present invention relates to a tape loading device, and more particularly, to a tape loading device for use in a tape recorder which, when the tape is loaded, prevents the force on a pole base from being transmitted back to a driving gear member and main slide, so that the gear member and main slide can be protected from abrasion.

2. Description of the Related Art

FIGS. 1 and 2 show a conventional tape loading device. Such a loading device includes a pair of loading gears 1 and 2 which rotate while engaged with each other; a main slide 3 capable of being moved laterally and having a rack gear portion 4 which is in mesh with a sector gear portion 1' of the driving loading gear 1; a pair of loading arms 5 and 6, resiliently mounted on loading gears 1 and 2, respectively, by means of springs 7 and 8; a pair of pole bases 9 and 10 each having a guide roller for guiding a tape 100 and a slanted pole; and a pair of connecting links 11 and 12, one end of each being connected to loading arms 5 and 6 respectively, and their other ends being connected to pole bases 9 and 10, respectively.

In the above-described tape loading device, main slide 3 is moved in one direction by means of a motor (not shown) and a master gear (not shown), so as to rotate the driving loading gear 1. At this time, loading gears 1 and 2, being engaged with each other, are rotated to move pole bases 9 and 10 and thus load the tape 100 onto a rotary drum 13, as shown in FIG. 1. Once the tape has been loaded, main slide 3 is moved further in the same direction so as to further rotate the driving loading gear 1. At this time, loading gears 1 and 2 both rotate, so that springs 7 and 8 are completely extended and pole bases 9 and 10 are pressed to be secured at the loading positions, respectively.

However, with the tape thus loaded, pole bases 9 and 10 are pushed in the unloading direction (indicated by arrow A) by tape 100. This force is transmitted back to loading gears 1 and 2 via connecting links 11 and 12 and loading arms 5 and 6 (because springs 7 and 8 are fully extended), and ultimately acts on sector gear portion 1' of the driving loading gear 1 and on rack gear portion 4 which is in mesh with sector gear portion 1'. Thus, rack gear portion 4 of main slide 3 and the sector gear portion 1' become worn unnecessarily.

Also, as shown in FIG.2, the above conventional tape loading device includes loading gears 1 and 2 and loading arms 5 and 6, separately arranged on the tape recorder deck and resiliently installed in contact with one another via springs 7 and 8. Such a structure is complicated and requires many components, making assembly difficult and resulting in high manufacturing costs.

SUMMARY OF THE INVENTION

To overcome the above-mentioned problems, it is an object of the present invention to provide a tape loading device which, when the tape is loaded, prevents the force on a pole base from being transmitted back to the driving gear member and main slide, and which has fewer components.

To accomplish the above object, the present invention is a tape loading device having two gear members which rotate by the movement of a rack gear portion of a main slide, and a pair of pole bases respectively connected to the gear members and to a pair of linkage arms, for loading/unloading the tape with respect to a rotary drum by means of the rotation of the gear members. The invention further includes a device for resiliently biasing the pole bases in the loading direction while in a tape-loaded state.

BRIEF DESCRIPTION OF THE DRAWINGS

The object of the present invention will become more apparent from the following detailed description when taken in conjunction with the accompanying drawings in which.

DETAILED DESCRIPTION OF THE INVENTION

Figure 1:
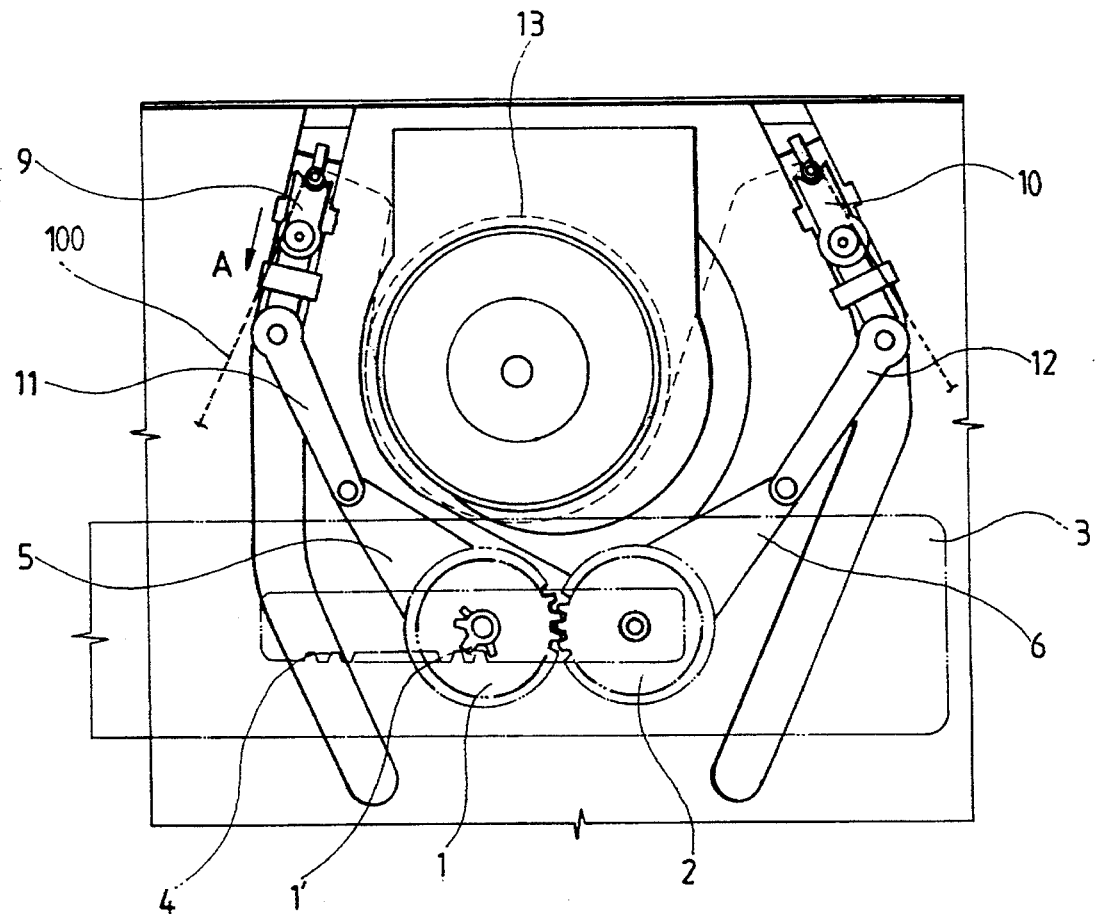
FIG. 1 is a schematic plan view of a conventional loading device.
Figure 2:
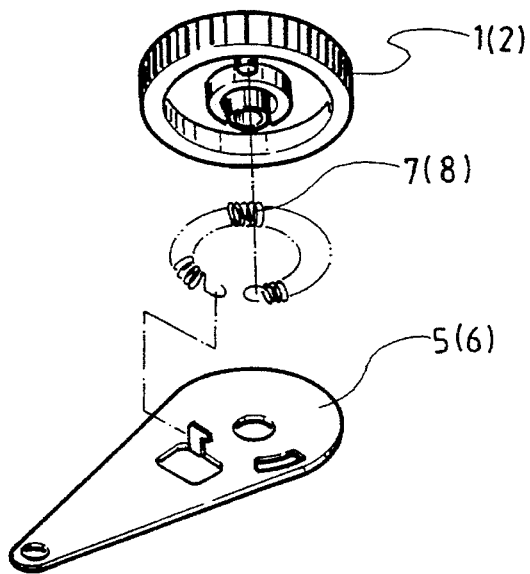
FIG. 2 is a detailed view of the driving loading gear and loading arm of FIG. 1.
Figure 3:
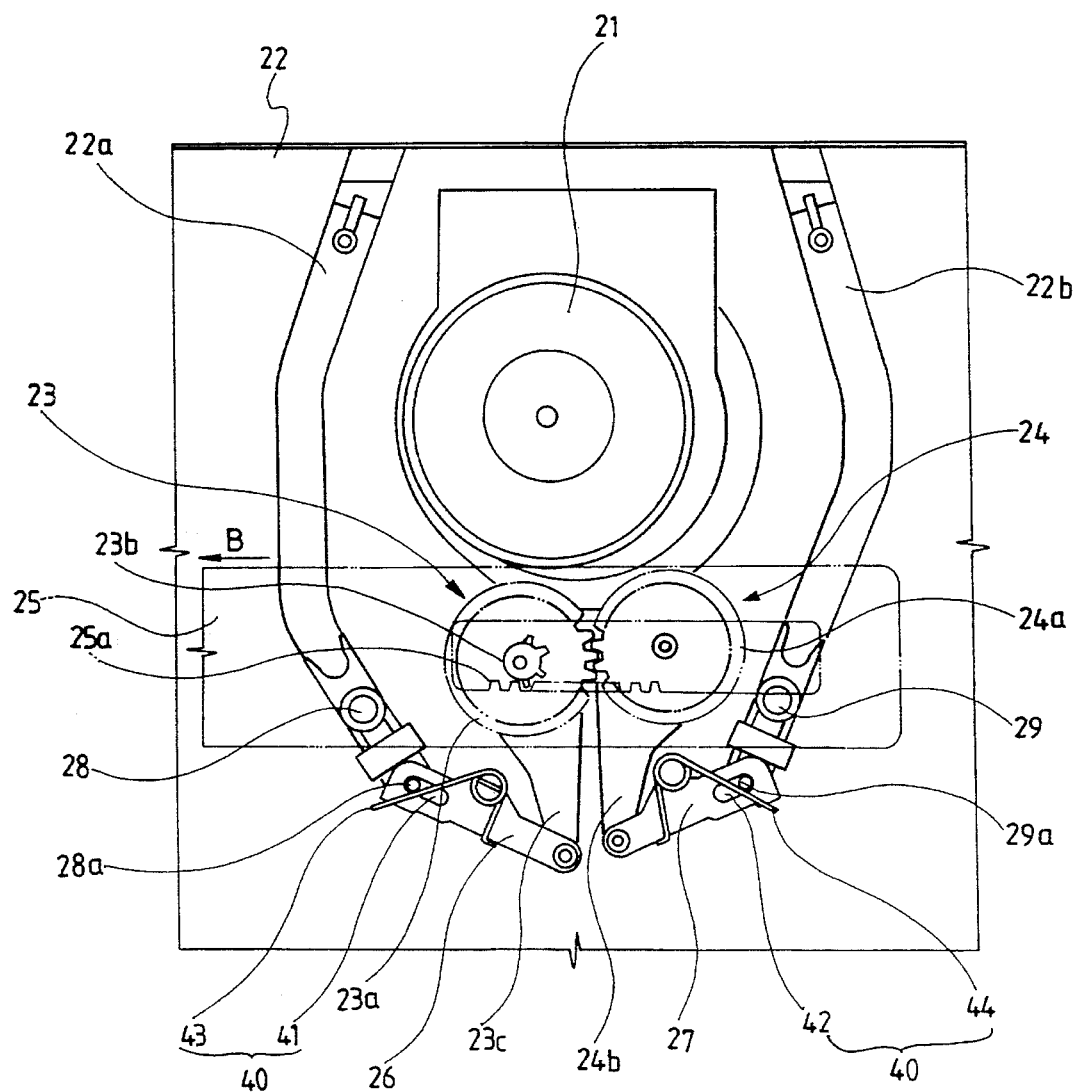
FIG. 3 is a plan view showing the tape loading device according to the preferred embodiment, in which the tape is not yet loaded.
Figure 4:
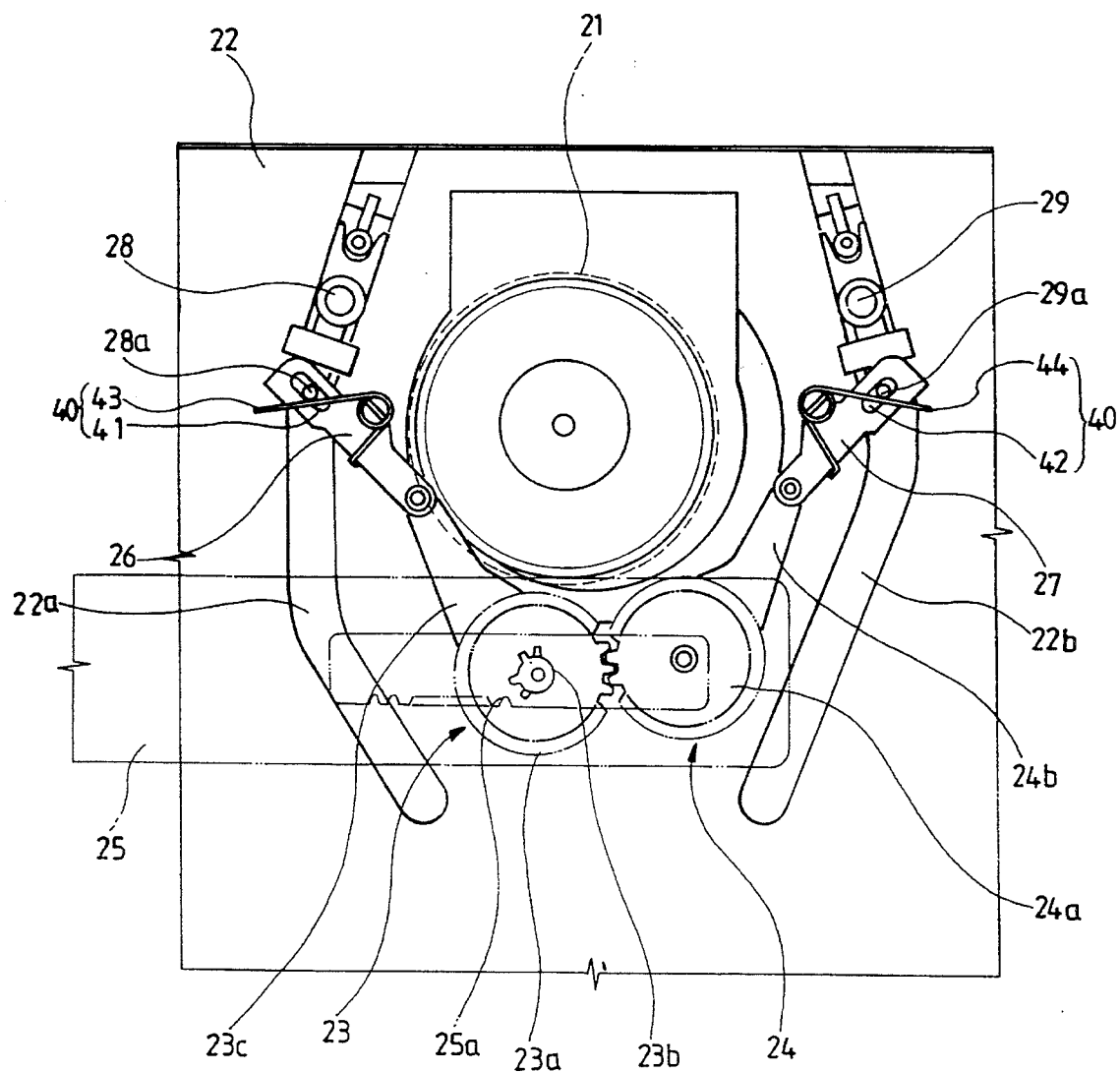
FIG. 4 is a plan view showing the tape loading device according to the preferred embodiment, in which the tape has been loaded.
Figure 5:
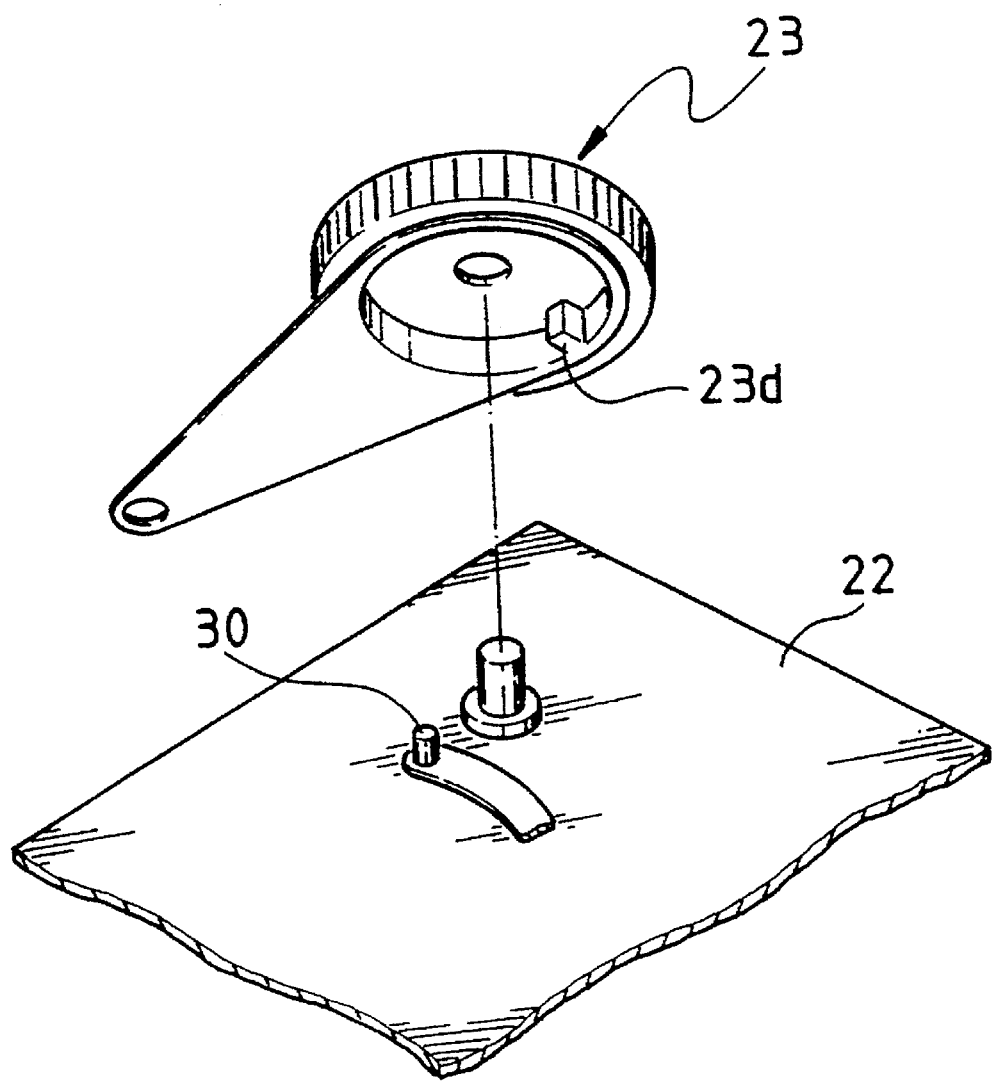
FIG. 5 is a detailed view of the driving gear and loading arm of FIG. 3.

The tape loading device according to the preferred embodiment of the present invention, as shown in FIGS. 3, 4 and 5, has driving gear 23 and driven gear 24 which are engaged with each other and positioned near rotary drum 21.

Driving gear 23 has established on one side thereof gear teeth 23a and a sector gear 23b, which are in coaxial alignment with respect to each other. On the side of driving gear 23, which is opposite sector gear 23b, there is an arm section 23c which is integrally molded together with driving gear 23. Also, driven gear 24 has established on one side thereof gear teeth 24a which are engaged with gear teeth 23a of driving gear 23. On the other side of driven gear 24, there is an arm section 24b which is integrally molded with driven gear 24.

A deck 22 supports a main slide 25 having a rack gear 25a which is engaged with sector gear 23b of driving gear 23, so that the main slide rotates the driving gear 23 and driven gear 24 as the main slide moves linearly. Main slide 25 is movable laterally. Linkage arms 26 and 27 are hinge-combined with arm section 23c of driving gear 23 and arm section 24b of driven gear 24, respectively. Also, the other ends of linkage arms 26 and 27 are connected to pole bases 28 and 29, respectively. Pole bases 28 and 29 can be moved along guide grooves 22a and 22b, respectively, which are formed on deck 22. Deck 22 has the conventional guide rollers and slanted poles for tape guidance.

Linkage arms 26 and 27 are provided with device 40 for resiliently biasing pole bases 28 and 29 in the loading direction while the tape is in the loaded state.

Resilient biasing means 40 includes slots 41 and 42 formed on linkage arms 26 and 27, respectively, in which connection pins 28a and 29a of pole bases 28 and 29 are inserted, and torsion springs 43 and 44 for respectively pushing against pole bases 28 and 29 and resiliently biasing the pole bases towards rotary drum 21 in the state in which the tape is loaded. The torsion springs 43 and 44 are provided on linkage arms 26 and 27 respectively.

Referring to FIG. 5, a stop 23d is formed on the inner wall of driving gear 23, and a fixed peg 30 is formed on deck 22 so as to come into contact with stop 23d and thereby restrict the rotation of gears 23 and 24. Here, fixed peg 30 may be integrally molded on deck 22.

Figure 6:
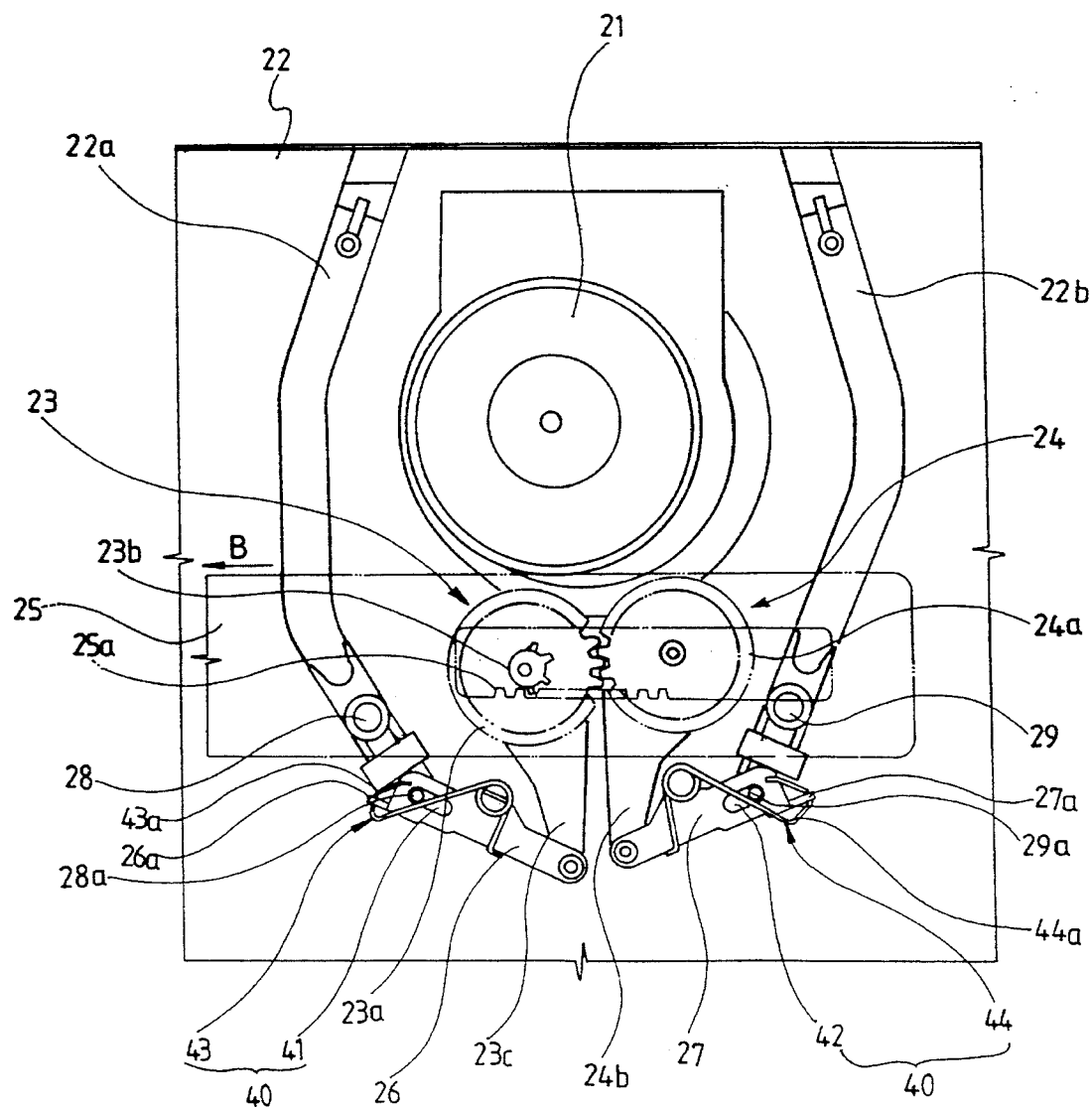
FIG. 6 illustrates another preferred embodiment in the unloaded state.
Figure 7:
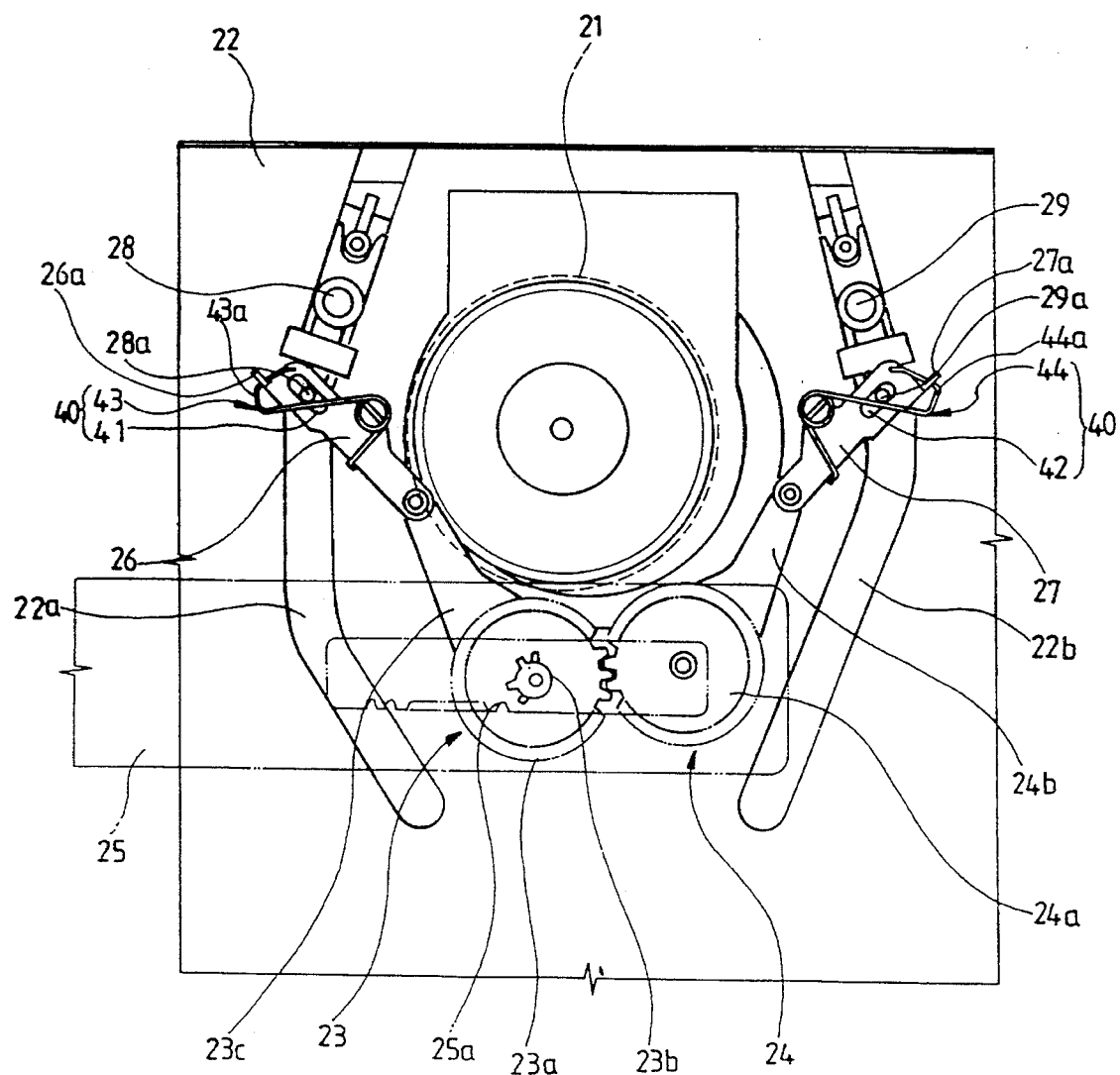
FIG. 7 illustrates the embodiment of FIG. 6 in the loaded state.

FIGS. 6 and 7 illustrate another embodiment of the tape loading device of the present invention. In this embodiment, the same numerals designate the same components as those of the first embodiment, with the detailed description thereof omitted. In this embodiment, protrusions 26a and 27a are formed on respective linkage arms 26 and 27. Bent portions 43a and 44a are formed on the end portions of torsion springs 43 and 44 respectively so as to be hooked by the respective protrusions 26a and 27a.

The operation of the tape loading device according to the present invention will be described hereinbelow.

First, as shown in FIG. 3, main slide 25 is moved in the direction "B" by means of the motor and master gear, before the tape is loaded. Thus, driving gear 23 is rotated clockwise. Next, driven gear 24 engaged with driving gear 23 is rotated in response to the rotation of driving gear 23, so that pole bases 28 and 29 are moved, as shown in FIG. 4, to load the tape onto rotary drum 21. When the tape is thus loaded, linkage arms 26 and 27 are rotated, as shown in FIG. 4, so that the portion thereof connected to arm sections 23c and 24b respectively moves closer to rotary drum 21. One end of each torsion spring 43 or 44 pushes connection pin 28a or 29a of pole bases 28 or 29, so that pole bases 28 and 29 have pushing forces applied thereto.

Meanwhile, referring to the embodiment of FIGS. 6 and 7, as pole bases 28 and 29 are loaded, the bent portions 43a and 44a of torsion springs 43 and 44 are resiliently deformed by the protrusions 26a and 27a so that the portions of torsion springs 43 and 44 which compress connection pins 28a and 29a are elastically biased toward the loading direction.

For this reason, the compression force of pole bases 28 and 29 is enhanced. Accordingly, forces applied to pole bases 28 and 29 are prevented from being transmitted back to driving gear 23 and main slide 25, because force on pole bases 28 and 29 from the tape will be absorbed by the linkage to torsion springs and arms 26 and 27. Accordingly, rack gear 25a of main slide 25 and sector gear 23b of driving gear 23 can be saved from excessive wear.

Further, when linkage arms 26 and 27 are near rotary drum 21, further rotation is limited by fixed peg 30 contacting stop 23d formed on the inner wall of driving gear 23. Thus, each linkage arm has a limited rotation angle.

Driving gear 23 and driven gear 24 have on one side thereof gear teeth 23a and 24a respectively and, on the opposite sides, have arm sections 23c and 24b integrally molded respectively thereon, and connected with links 26 and 27. As a result, the number of required components can be decreased with respect to the conventional device in which the loading gears and loading arms are separately manufactured. Therefore, assembly is facilitated and the manufacturing cost can be reduced.

As described above, the tape loading device according to the present invention rotates the linkage arms towards a rotary drum using resilient biasing means when the tape is loaded and resiliently biases the pole bases in the loading direction, while preventing the forces exerted on the pole bases from being transmitted back to the main slide. Accordingly, the sector gear portion of the driving gear and the rack gear portion of the main slide engaged with the sector gear portion can be protected from abrasion.

Control of the device disclosed above can be accomplished through known controllers and actuation devices. Also, while the invention has been described through preferred embodiments, however various modifications can be made without departing from the scope of the invention, as defined by the appended claims.

What is claimed is:

1. A tape loading device comprising:

a deck;

two gear members disposed on said deck in a rotatable manner, said two gear members being engaged with each other;

a main rack having a rack gear formed thereon, said rack gear being engaged with one of said gear members, said rack gear being slidably mounted on said deck;

a pair of linkage arms respectively connected to said gear members;

a pair of pole bases respectively connected to said linkage arms, said pole bases being moveable, in a loading direction, from an unloaded position to a loaded position, in which said pole bases cause a tape to be loaded on a rotary drum head, in response to rotation of said gear members;

means disposed on said linkage arms for resiliently biasing said pole bases in the loading direction when said pole bases are in the loaded position.

2. A tape loading device as claimed in claim 1, wherein said biasing means comprises a connection pin formed on each of said pole bases, a slot formed in each of said linkage arms and inserted into said connection pins, and a pair of torsion springs respectively mounted on said linkage arms, one side portion of each torsion spring coming into contact with a respective one of said connection pins.

3. A tape loading device as claimed in claim 2, wherein said biasing means further comprises, a protrusion formed on each of said linkage arms, bent portions coming into contact with said protrusions are formed on end portions of said torsion springs so that, as said pole bases move in the loading direction, a resilient force of said bent portions is applied to said portion of said torsion springs coming into contact with said connection pins.

4. A tape loading device as claimed in claim 1, one of said two gear members has a stop formed on the inner wall thereof, and a fixed peg is mounted on said deck to limit the rotation of said two gear members by coming into contact with said stop.

5. A tape loading device as claimed in claim 1, wherein said two gear members have gear teeth formed on one side thereof, respectively, and have, on the other sides thereof, integrally formed arm sections which are coupled with said linkage arms, respectively.

6. A tape loading device as claimed in claim 4, wherein said two gear members have gear teeth on one side thereof, respectively, and have, on the other sides thereof, integrally formed arm sections which are coupled with said linkage arms, respectively.

7. A tape loading device comprising:

a deck;

two gear members disposed on said deck in a rotatable manner, said two gear members being engaged with each other;

a main rack having a rack gear formed thereon, said rack gear being engaged with one of said gear members, said rack gear being slidably mounted on said deck;

a pair of linkage arms respectively connected to said gear members;

a pair of pole bases respectively connected to said linkage arms, said pole bases being moveable, in a loading direction, from an unloaded position to a loaded position, in which said pole bases cause a tape to be loaded on a rotary drum head, in response to rotation of said gear members;

means for resiliently biasing said pole bases in the loading direction when said pole bases are in the loaded position;

wherein said biasing means comprises a connection pin formed on each of said pole bases, a slot formed in each of said linkage arms and inserted into said connection pins, and a pair of torsion springs respectively mounted on said linkage arms, one side portion of each torsion spring coming into contact with a respective one of said connection pins.

8. A tape loading device as claimed in claim 7, wherein said biasing means further comprises a protrusion formed on each of said linkage arms, bent portions coming into contact with said protrusions are formed on end portions of said torsion springs so that, as said pole bases move in the loading direction, a resilient force of said bent portions is applied to said portion of said torsion springs coming into contact with said connection pins.

* * * * *